(12) United States Patent
Helmer et al.

(10) Patent No.: US 9,242,636 B2
(45) Date of Patent: Jan. 26, 2016

(54) CLUTCH DEVICE AND ELECTRIC MACHINE

(71) Applicant: Schaeffler Technologies GmbH & Co. KG, Herzogenaurach (DE)

(72) Inventors: Daniel Helmer, Achern-Fautenbach (DE); Florian Vogel, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/364,149

(22) PCT Filed: Dec. 12, 2012

(86) PCT No.: PCT/DE2012/001190
§ 371 (c)(1),
(2) Date: Jun. 10, 2014

(87) PCT Pub. No.: WO2013/087061
PCT Pub. Date: Jun. 20, 2013

(65) Prior Publication Data
US 2014/0315682 A1     Oct. 23, 2014

(30) Foreign Application Priority Data
Dec. 14, 2011   (DE) .......................... 10 2011 088 473

(51) Int. Cl.
*B60W 10/02* (2006.01)
*B60W 20/00* (2006.01)
*B60K 6/387* (2007.10)
(Continued)

(52) U.S. Cl.
CPC ............... *B60W 20/00* (2013.01); *B60K 6/387* (2013.01); *B60W 10/02* (2013.01); *B60W 20/40* (2013.01); *F16D 28/00* (2013.01); *B60K 2006/4825* (2013.01); *F16D 27/004* (2013.01); *F16D 2023/123* (2013.01); *F16H 1/32* (2013.01); *Y02T 10/6252* (2013.01); *Y10S 903/902* (2013.01); *Y10T 477/26* (2015.01)

(58) Field of Classification Search
CPC ........... F16H 1/32; F16D 28/00; B60W 10/02
See application file for complete search history.

(56) References Cited

U.S. PATENT DOCUMENTS

| 6,888,273 | B2 * | 5/2005 | Hughes et al. ............... 180/65.8 |
| 7,001,303 | B1 | 2/2006 | Peura |
| 2001/0029221 | A1 | 10/2001 | Oliveira et al. |
| 2003/0171182 | A1 | 9/2003 | Peura |
| 2004/0084979 | A1 | 5/2004 | Hughes et al. |

(Continued)

FOREIGN PATENT DOCUMENTS

| CN | 1911704 A | 2/2007 |
| DE | 3834555 | 9/1989 |
| DE | 20320491 U1 | 11/2004 |

*Primary Examiner* — Derek D Knight
(74) *Attorney, Agent, or Firm* — Volpe and Koenig, P.C.

(57) ABSTRACT

The invention relates to a clutch device having an actuating device for a drivetrain of a motor vehicle, the drivetrain having an internal combustion engine, an electric machine with a stator and a rotor, and a transmission device, wherein the clutch device can be arranged in the drivetrain between the internal combustion engine at one side and the electric machine and the transmission device at the other side, the clutch device and the actuating device are integrated into the rotor of the electric machine, and the actuating device has a rotatable ramp device with first ramps and second ramps, wherein the clutch device has an electric actuator for actively rotating the ramp device, in order to structurally and/or functionally improve the clutch device, and to an electric machine having a stator, a rotor and a clutch device of this type integrated into the rotor.

5 Claims, 2 Drawing Sheets

(51) Int. Cl.
*F16D 28/00* (2006.01)
*F16H 1/32* (2006.01)
*F16D 27/00* (2006.01)
*F16D 23/12* (2006.01)
*B60K 6/48* (2007.10)

(56) References Cited

U.S. PATENT DOCUMENTS

2008/0059032 A1 3/2008 Hofmann
2009/0032352 A1 2/2009 Pritchard et al.

* cited by examiner

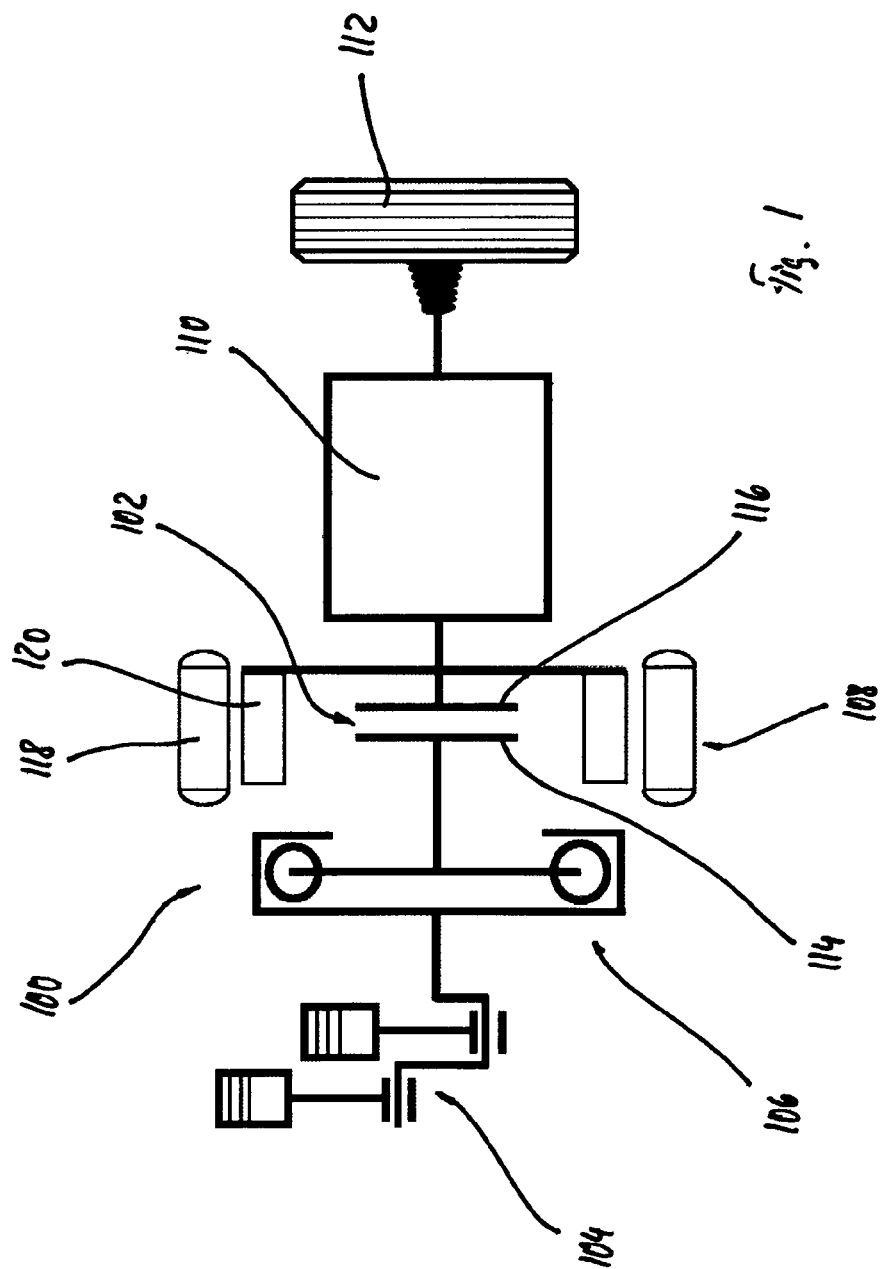

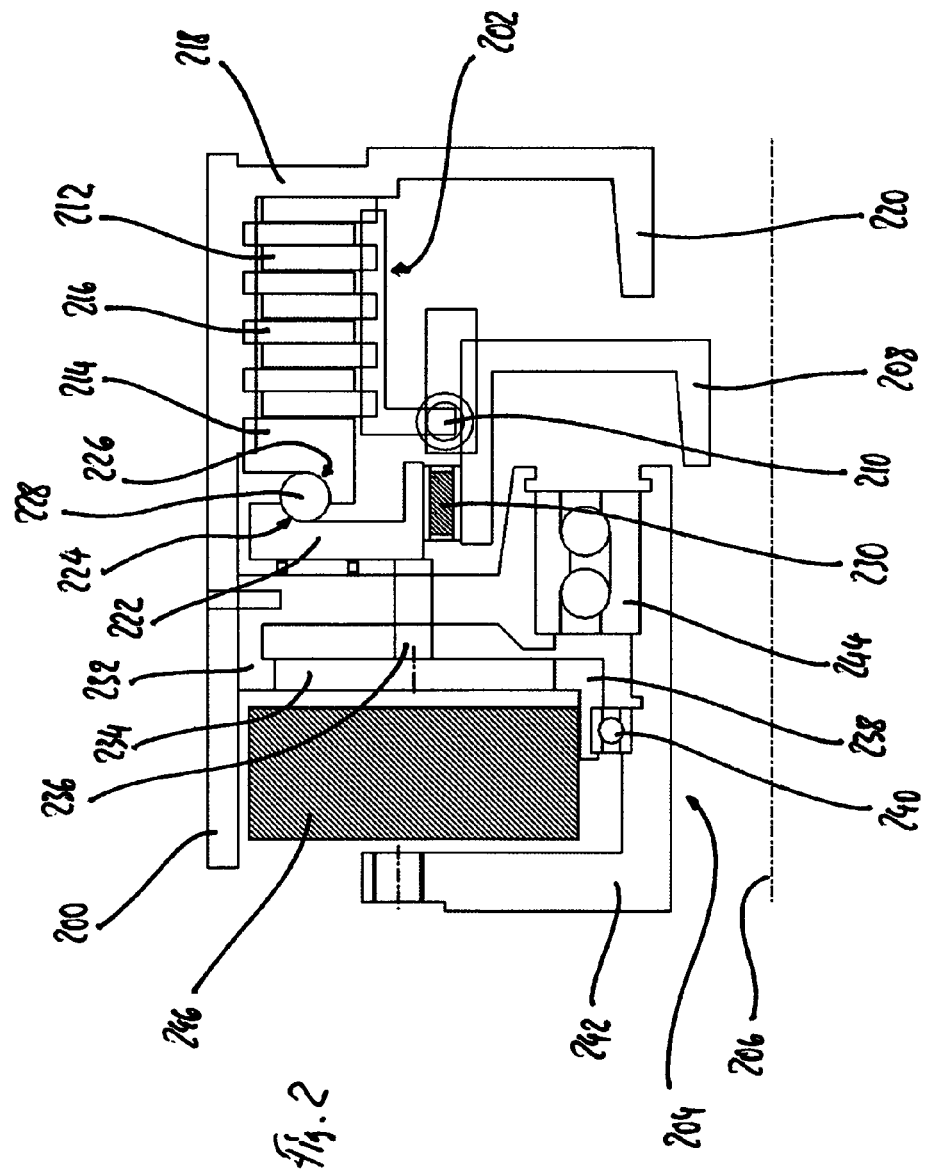

CLUTCH DEVICE AND ELECTRIC MACHINE

BACKGROUND

The invention relates to a clutch device with an actuating device for a drivetrain of a motor vehicle, with the drivetrain comprising an internal combustion engine, an electric machine with a stator and a transmission device, with the clutch device in the drivetrain can be arranged between the internal combustion engine on the one side and the electric machine and the transmission device on the other side, the clutch device and the actuating device being integrated in the rotor of the electric machine, and the actuating device comprising a rotational ramp device with first ramps and second ramps. Additionally the invention relates to an electric machine with a stator, a rotor, and a respective clutch device integrated in the rotor.

SUMMARY

The German patent application with the reference 10 2011 088 473.4 discloses a clutch device with an actuating device for a drivetrain of a motor vehicle, comprising an internal combustion engine, an electric machine with a stator and a rotor and a transmission device, with the clutch device being arranged in the drivetrain between the internal combustion engine on the one side and the electric machine and the transmission device on the other side, with the clutch device and the actuating device being integrated in the rotor of the electric machine. For detailed information regarding the features of the present invention, reference is explicitly made to the German patent application with the reference 10 2011 088 473.4. The teaching of this publication shall be considered a part of the present document (and is incorporated herein by reference). The features of said publication are also features of the present document.

The invention is based on the objective to structurally and/or functionally improve the above-mentioned clutch device. In particular, the operating of the clutch device shall also be possible when the internal combustion engine and/or the electric machine are stationary. In particular, a function as an immobilizer shall be possible, here. In particular when subjected to electricity a pilot control moment for operating the clutch device shall be possible. Additionally, the invention is based on the objective to provide an electric machine with a stator, a rotor, and a clutch device integrated in the rotor.

This objective is attained in a clutch device with an actuating device for a drivetrain of a motor vehicle, with the drivetrain comprising an internal combustion engine with a stator and a rotor and a transmission device, with the clutch device in the drivetrain can be arranged between the internal combustion engine on the one side and the electric machine and the transmission device on the other side, with the clutch device and the actuating device being integrated in the rotor of the electric machine and the actuating device comprising a rotational ramp device with first ramps and second ramps, with the actuating device comprising an electric actuator for an active distortion of the ramp device.

The internal combustion engine, the clutch device, the electric machine, and the transmission device may be arranged in the above-mentioned sequence in the drivetrain. A torsional vibration damper may be arranged in the drivetrain, particularly a two-weight flywheel. The torsional vibration damper may comprise an input part, an output part, which is rotational in reference to the input part, and at least one energy storage device effective between the input part and the output part. The identifications "input part" and "output part" relate to the power flow emitted by the internal combustion engine. The torsional vibration damper may be arranged in the drivetrain between the internal combustion engine and the clutch device. The torsional vibration damper may be arranged in the drivetrain between the internal combustion engine and the electric machine. The input part of the torsional vibration damper may be connected in a driving fashion to the internal combustion engine. The output part of the torsional vibration damper may be connected in a driving fashion to the clutch device. The output part of the torsional vibration damper may be connected in a driving fashion to the electric engine. At least one wheel, which can be driven, may be arranged in the drivetrain. At least one wheel, which can be driven, may be arranged downstream in the drivetrain of the transmission device.

The motor vehicle may comprise a hybrid drive. The motor vehicle may have a first energy converter. The first energy converter may represent the internal combustion engine. The internal combustion engine may be operated with a hydrocarbon fuel, such as gasoline, diesel, liquefied petroleum gas (LPG, GPL), compressed natural gas (CNG), or liquefied natural gas (LNG). The internal combustion engine may be operated with hydrogen. The motor vehicle may include a first energy store. The first energy store may represent a fuel tank. The first energy store may be a fluid tank. The motor vehicle may have a second energy converter. The second energy converter may be an electric machine. The electric machine may be operational as an electric motor. The electric machine may be operated as a generator. The electric machine may structurally combine an electric motor and a generator. The electric machine may be a starter generator. The motor vehicle may have a second energy store. The second energy store may be an electric energy store. The second energy store may be a battery. The energy converter may serve for driving the motor vehicle. Here, mechanic power may be generated by the energy converter. The motor vehicle may have a parallel hybrid drive. The motor vehicle may have a full hybrid drive.

The coupling device may have a friction clutch. The clutch device may have a multi-disk clutch. The clutch device may have a single-disk clutch. The clutch device may have a dry clutch. The clutch device may have a wet clutch. The clutch device may have a housing. The clutch device may have a compression plate. The clutch device may have at least one intermediate pressure plate. The clutch device may have a pressure plate. The compression plate, at least one intermediate pressure plate, and/or the pressure plate may have friction coatings. The clutch device may have at least one clutch disk. At least one clutch disk may have friction coatings. Intermediate pressure plates and clutch disks may be arranged alternating. The compression plate may be displaceable within axial limits in reference to the pressure plate. At least one clutch disk may optionally be clamped between the compression plate, at least one intermediate pressure plate, and/or the pressure plate.

The clutch device may be arranged in the drivetrain between the internal combustion engine and the electric machine. The clutch device may be arranged in the drivetrain between the internal combustion engine and the rotor of the electric machine. The clutch device may have an input part and an output part. The identification "input part" and "output part" relate to a power flow aligned towards a wheel of the motor vehicle, which can be driven. The input part of the clutch device may have at least one clutch disk. The input part of the clutch device may be connected in a driving fashion to the internal combustion engine. The output part of the clutch device may comprise a compression plate, at least one intermediate pressure plate, and/or a pressure plate. The output part of the clutch device may optionally be connected in a driving fashion to the electric machine. The output part of the clutch device may be connected in a driving fashion to the rotor of the electric machine. The clutch device may be arranged in the drivetrain between the internal combustion engine and the transmission device. The output part of the clutch device may be connected to the transmission device in a driving fashion. The output part of the clutch device may be connected in a driving fashion to the input shaft of the transmission device. The clutch device may optionally be arranged in the drivetrain between the torsional vibration damper and the electric machine. The input part of the clutch device may be connected in a driving fashion to the torsional vibration damper. The input part of the clutch device may be connected in a driving fashion to the output part of the torsional vibration damper. The clutch device may optionally be arranged in the drivetrain between the torsional vibration damper and the transmission device.

Starting from a completely disengaged operating position, in which essentially no power transmission occurs between the input part and the output part, to a completely engaged operating position, in which between the input part and the output part essentially all power is transmitted, the clutch device can allow increasing power transmission, depending on the actuator, with the power transmission between the input part and the output part may occur in a force-fitting, particularly friction-fitting fashion. Inversely, starting from a completely engaged operating position, in which essentially all power is transmitted between the input part and the output part to a completely disengaged operating position, in which essentially no power transmission occurs between the input part and the output part, a reducing power transmission may be possible, depending on the actuator. A completely engaged operating position may be a closed cooperating position. A completely disengaged operating position may be an open operating position.

The clutch device may have a moment sensor. The moment sensor may be arranged at an input part of the clutch device. The moment sensor may comprise an input part, an output part, which can be rotated in reference to said input part, and at least one energy storage device effective between the input part and the output art. A moment may be determinable based on the relative rotation between the input part and the output part opposite a force of the energy storage. A control and/or an opening of the clutch device may occur via the moment sensor.

The transmission device may have an input shaft and an output shaft. The identifications "input shaft" and "output shaft" relate to a power flow originating at the internal combustion engine or the electric machine. The transmission device may have a stepped transmission. The transmission device may have a continuously variable transmission. The transmission device may have a double clutch transmission. The transmission device may have a torque converter transmission. The transmission device may be shifted manually. The transmission device may be shifted automatically. The input shaft may be connected in a driving fashion to the electric machine. The input shaft may be connected in a driving fashion to the rotor of the electric machine. The input shaft may be connected in a driving fashion to the clutch device. The input shaft may be connected in a driving fashion to the output part of the clutch device. The output shaft may be connected in a driving fashion to at least one wheel, which can be driven.

The electric machine may have a housing. The stator may be arranged fixed in reference to said housing. The stator may be arranged radially outside the rotor. The electric machine may have at least one shaft or hub. The rotor may be arranged fixed on at least one shaft or hub. The rotor may be arranged radially inside the stator. The electric machine may have a first shaft or hub and a second shaft or hub. The first shaft or hub and the second shaft or hub may be arranged coaxially. The rotor may be arranged fixed at the second shaft or hub. The first shaft or hub may be allocated to the input part of the clutch device. The second shaft or hub may be allocated to the output part of the clutch device. The rotor may have a sheath-like shape. The rotor may have a tubular shape. The rotor may have a hollow-cylindrical form. A receiving chamber may be formed in the rotor.

A clutch device integrated in the rotor may be a clutch device, which is arranged at least almost entirely inside the rotor. A clutch device integrated in the rotor may be a clutch device, which is arranged radially at least almost entirely inside the rotor. A radial direction represents a direction perpendicular in reference to the rotary axis of the electric machine. A clutch device integrated in the rotor may represent a clutch device, which is arranged axially at least almost entirely inside the rotor. An axial direction is a direction of alignment of a rotary axis of the electric machine. An actuating device, integrated in the rotor, may represent an actuating device, which is arranged at least almost entirely inside the rotor. An actuating device integrated in the rotor may represent an actuating device, which is arranged radially at least almost entirely inside the rotor. An actuating device integrated in the rotor may be an actuating device, which is arranged axially at least almost entirely inside the rotor. The clutch device and the actuating device may be arranged behind each other in the direction of extension of the rotary axis of the clutch device. The actuating device may be arranged at the side facing the internal combustion engine. The clutch device may be arranged at a side facing the transmission device.

The compression plate of the clutch device may be axially displaceable by the actuating device. The clutch device may be opened or closed by the actuating device. The clutch device may be engaged or disengaged by the actuating device.

The actuating device may be self-energizing. This allows shifting a relatively large operating power with a relatively low operating force. An actuating force may be self-energizing. The low actuating force may also be called a pilot control moment. This requires reduced actuating energy in order to engage and/or disengage the clutch device. A reduced actuating force is required. A reduced actuating stroke is required. The actuator may have a reduced power. The actuator may have a lower power input. The actuator may have a reduced structural space. The actuator may have a lower weight. The shifting speed may be increased.

The first ramps may be arranged annularly in the circumferential direction of the clutch device. The second ramps may be arranged annularly in the circumferential direction of the clutch device. The first ramps and the second ramps may be rotational in reference to each other. Starting from a motion in the circumferential direction of the clutch device, the ramp device may allow a motion in the direction of extension of the rotary axis of the clutch device. The ramp device may be axially influential. Roller bodies, particularly balls, may be arranged between the first ramps and the second ramps. The ramps may form running surfaces for the roller bodies. The ramps may be embodied as roller body ramps, particularly ball ramps. The ramps may be arranged distributed in the circumferential direction of the clutch device. The ramps may be arranged diagonal in reference to a level perpendicular to the axis of rotation of the clutch device. The ramps may incline and/or decline in the circumferential direction of the clutch device. The ramps may be inclining at one side. The ramps may be inclining at both sides. The first ramps and the second ramps may be embodied in a geometrically complementary form in reference to each other. The first ramps may correspond to the second ramps such that during a motion of the first ramps and the second ramps in the circumferential direction of the clutch device in reference to each other the first ramps and the second ramps move towards each other or away from each other in the direction of extension of the rotary axis of the clutch device. The first ramps may support the roller bodies radially from the inside. The second ramps may support the roller bodies radially from the outside. The roller bodies may have such a diameter that they are held between the first ramps and the second ramps such that they cannot get lost. The roller bodies may be arranged in a roller body cage. This way an even allocation is ensured of the roller bodies in reference to the ramps.

An active rotation requires no rotation of the clutch element, the actuator device, or the rotor. In an active rotation an actuating motion can be generated by the actuator alone.

In the clutch device according to the invention an actuating of the clutch device is also possible when the internal combustion engine and/or the electric machine are stationary. Here, a function of an immobilizer is possible. When subjected to electricity a pilot control moment is possible for actuating the clutch device.

The actuating device may have a rotational ramp ring, at which first ramps are arranged, and the clutch device may have a compression plate, which can be axially displaced within limits, at which the second ramps are arranged.

The actuator may act directly upon the ramp device. The actuator may be supported on the one side at the ramp device and on the other side at the housing of the clutch device. The actuator may act directly upon the ramp ring. The ramp ring may be directly rotational via the actuator.

Alternatively the actuator may act upon the ramp device with a planetary gear train with crank being interposed. The planetary gear train with crank may have a sun gear, planet gears, a rod and a hollow wheel, and the sun gear may be driven with the actuator, the rod may be connected fixed to the ramp device, and the hollow wheel may be connected fixed to the rotor. The rod may be connected fixed to the ramp ring. The planetary gear train with crank may also be called a planetary train. The sun gear may have external teeth. The planet gears may each have external teeth. The planet gears may engage the hollow wheel and the sun gear. With the actuator the sun gear can be impinged with a pilot control moment. With the actuator the sun gear may be impinged with a moment such that the ramp ring with the first ramp and the compression plate with the second ramp distort in reference to each other. The actuator can impact the rod. The actuator may impact the hollow wheel. An electric control device may be provided to control the actuator.

The actuator may have a magnetic clutch, a magnetic particle coupling, a magnetic-rheological clutch, an electro-rheological clutch, at least one Piezo-element, a hysteresis brake, an electric engine, a servomotor, or an actuator.

A magnetic clutch may represent a clutch with a magnetic field being involved in its operation or action. A magnetic clutch may represent an electro-magnetic clutch, a magnetic particle coupling, a magneto-rheological fluid clutch, or a touchless magnetic clutch.

An electromagnetic clutch may be an electrically remote-controllable, force or form-fitting clutch. The electromagnetic clutch may be similar in its principle structure to a single disk-dry clutch. The electro-magnetic clutch may have a stationary clutch part and a rotational clutch part. The electromagnetic clutch may have an electromagnet. The electromagnet may be arranged in a torque-proof fashion. With a magnetic field of the electromagnet the rotational clutch part may be accessible via an air gap. The electromagnetic clutch may comprise a compression plate, which is axially displaceable within limits, and a clutch disk. Depending on an electric voltage applied thereto an appropriately strong magnetic field may act upon the compression plate. The clutch disk can this way be clamped for transmitting power.

A magnetic particle coupling may represent a friction-fitting clutch. The magnetic particle coupling may have a driving pressure plate and a driven pressure plate. A gap may be arranged between the driving pressure plate and the driven pressure plate. Metallic powder or metallic gel may be arranged in the gap. The metallic powder or metallic gel may comprise metallic particles. An electromagnet may be arranged in a pressure plate. The electromagnet may magnetize the metallic particles and thereby stiffen them. This can generate a force-fitting connection. By changing an applied voltage here a transmission power can be controlled.

A magneto-rheological fluid clutch (MRF-clutch) may be designed like a magnetic particle coupling, in principle. Instead of a metallic powder, here however a magneto-rheological liquid may be used. This may be changed from liquid via gelatinous to solid under the influence of a magnetic field. The advantages of a MRF-clutch in reference to a metallic particle coupling are an improved sealing ability of the transmission medium towards the outside, reduced internal friction in the separated state, as well as an improved thermal dissipation. The MRF-clutch may be embodied in a disk or drum design as well as novel designs.

A touch-less magnetic clutch may also allow a power transmission through walls. A touchless magnetic clutch may have a permanent magnet or an electromagnet. A driving side of the touchless magnetic clutch may represent a rotary field of a stator of an electric engine.

An electro-rheological clutch (ERF-clutch) may in principle be structured like a magnetic particle coupling. Instead of magnetic particles here an electro-rheological liquid is used, though. Under the influence of an electric field it may change its consistency from liquid via gelatinous to solid.

A Piezo-element may use an inverted Piezo-effect and, when an electric voltage is applied, execute a mechanic motion. A small electrode distance may serve to achieve motion amplitudes as large as possible at low voltages. For this purpose the Piezo-elements may be arranged in several layers like cascades. Several thin Piezo-elements may be assembled with electrodes interposed, here. The Piezo-elements may have a mechanical serial arrangement, controlled by an electric parallel circuit.

A hysteresis brake may be based on the effects of a magnet or an electromagnet upon a moving ferromagnetic material. Here, energy loss may develop by a repeated reversal of magnetism of the material. Contrary to an eddy-current brake, the mechanic power in a hysteresis brake is not generated depending on the speed and/or rotation, i.e. the hysteresis brake operates evenly from the stationary state to the maximum speed and/or rotation possible in the respective construction.

An electric engine may represent an electro-mechanic converter, which converts electric energy into mechanic energy. In an electric engine a force, applied by a magnetic field upon a conductor of a coil, subject to current flowing through it, can be converted into motion. The electric engine may be embodied as a linear drive.

A servo-drive may be an electric motor, which combined with a servo-control forms a servo-drive. The servo-control may have a servo-amplifier and perhaps additional control circuit-transmission members. The servo-motor may be driven in a closed control circuit. The operation may occur controlled with regards to moment, speed, and/or position. Combinations are possible here by nesting the control circuits. A servo-motor may also be called an actuator motor.

Additionally, the solution of the objective underlying the invention occurs by an electric machine with a stator, a rotor, and a clutch device integrated in the rotor.

Summarizing and described in other words, as a result of the invention here there is provided, among other things, a control of an E-clutch and/or electric controls of an e-clutch. The elements magnetic clutch, magnetic particle coupling, magneto-rheological clutch, electro-rheological clutch, Piezo-elements, hysteresis brake, electric engine, and/or servo-engine/actuator motor may be used instead of an eddy-current brake. Some of them may be controlled electrically and also generate an immobilizing moment in the stationary state. The respective actuator element may be adapted either directly to the ramp system or a planet gear may be switched as an additional transmission between an actuator element and the ramps. The decision to use a planetary gear may depend on the required pilot control moment and the moment capacity of the selected actuator element as well as the structural space available. The elements may also be distributed arbitrarily on the planetary gear, if applicable. The ramps, the actuator element, and the rotor may each be placed on the sun, the rod, and the hollow wheel.

Here, "may" particularly relates to optional features of the invention. Accordingly there is respectively one exemplary embodiment of the invention which has the respective feature or the respective features.

BRIEF DESCRIPTION OF THE DRAWINGS

In the following, exemplary embodiments of the invention are explained in greater detail with reference to the figures. Additional features and advantages are discernible from the description. Concrete features of these exemplary embodiments may represent general features of the invention. Features connected to other features of these exemplary embodiments may represent individual features of the invention.

Shown schematically and as examples

FIG. 1 a drivetrain of a motor vehicle with a parallel full hybrid drive and a clutch device arranged in the drivetrain, and FIG. 2 a clutch integrated in a rotor of an electric machine with an operating device for a motor vehicle comprising a hybrid drive.

DETAILED DESCRIPTION OF THE PREFERRED EMBODIMENTS

FIG. 1 shows a drivetrain 100 of a motor vehicle, otherwise not shown in greater detail here, with a parallel full hybrid drive and a clutch device 102 arranged in the drivetrain 100. The drivetrain 100 comprises an internal combustion engine 104, a two-weight flywheel 106, the clutch device 102, an electric machine 108, a transmission 110, and at least one wheel 112, which can be driven. The electric machine 108 can be operated as a motor. The clutch device 102 is arranged in the drivetrain 100 between the two-weight flywheel 106 and the electric machine 108. The clutch device 102 is arranged in the drivetrain 100 between the two-weight flywheel 106 and the transmission 110.

The clutch device 102 comprises an input part 114 and an output part 116. The input part 114 of the clutch device 102 is connected to the two-weight flywheel 106. The output part 116 of the clutch 102 is connected to the electric machine 108. The electric machine 108 comprises a stator 118 and a rotor 120. The output part 116 of the clutch device 102 is connected to the rotor 120 of the electric machine 108. The output part 116 of the clutch device 102 is connected to the transmission 110. The electric machine 108 is connected to the transmission 110. The rotor 120 of the electric machine 108 is connected to the transmission 110.

FIG. 2 shows a clutch 202, integrated in a rotor 200 of an electric machine otherwise not shown in greater detail here, such as the clutch 102 according to FIG. 1, with an actuator device 204 for a motor vehicle with a hybrid drive.

The rotor 200 comprises a rotary axis 206. The clutch 202 is arranged inside the rotor 200 in the direction of extension of the rotary axis 206 as well as in the radial direction. The clutch 202 comprises an input part and an output part. The input part comprises a hub part 208, a moment sensor 210, and clutch disks, such as 212. The output part of the clutch 202 comprises a compression plate 214, intermediate pressure plates, such as 216, a pressure plate 218, and a hub part 220. The clutch disks 212 are connected to the hub part 208 in a torque-proof fashion. The compression plate 214, the intermediate pressure plates 216, and the pressure plate 218 are connected to the hub part 220 in a torque-proof fashion. The compression plate 214, the intermediate pressure plates 216, and the pressure plate 218 are connected to the rotor 200 in a torque-proof fashion. The compression plate 214 is displaceable within axial limits in the direction of extension of the rotary axis 206.

An actuating device 204 is provided to operate the clutch 202. The actuating device 204 is arranged inside the rotor 200 in the direction of extension of the rotary axis 206 as well as in the radial direction. The compression plate 214 can be impinged with an actuating force by the actuator device 204. The compression plate 214 can be axially displaced by the actuating device 204.

The actuating device comprises a ramp device. The ramp device comprises a ramp ring 222 with first ramps, such as 224. The ramp device comprises second ramps, such as 226. The second ramps 226 are arranged at the compression plate 214. Balls 228 are arranged between the first ramps 224 and the second ramps 226. Via the bearing 230, the ramp ring 222 is supported rotationally on the hub part 208. The ramp ring 222 with the first ramps 224 is rotational about the rotary axis 206 in reference to the compression plate 214 with the second ramps 226. The rotation of the ramp ring 220 leads to a change of the distance between the contact areas of the first ramps 224 and the contact areas of the second ramps 226 in a direction of extension of the rotary axis 206. This way, a clamping of the balls 228 between the first ramps 224 and the second ramps 226 can be controlled.

The actuating device comprises a planetary drive with a hollow wheel 232, planetary gears, such as 234, a rod 236, and a sun gear 238. The hollow wheel 232 comprises internal teeth. The sun gear 238 comprises external teeth. The planetary gears 234 each comprise external teeth and engage the hollow wheel 232 and the sun gear 238. The rod 236 connects the planetary gears 234. The hollow wheel 232 is connected fixed to the rotor 200. The planetary carrier is connected fixed to the ramp ring 222. The sun gear 238 is supported rotational via a bearing 240 on a fixed shaft stub 242. The rotor 200 is rotationally supported via the hollow wheel 232 and a bearing 244 on the shaft stub 242. The bearing 244 is embodied here as a double-row ball bearing.

The actuating device comprises an electric actuator 246. The actuator 246 may act upon the sun gear 238 of the planetary drive. This way, a preliminary control moment can be introduced via the sun gear 238 for operating the clutch 202. Using the actuator 246 the ramp ring 222 can be actively rotated independent from any rotation of the rotor 200. The actuator 246 represents for example a magnetic clutch, a magnetic particle coupling, a magneto-rheological clutch, an electro-rheological clutch, a Piezo-actuator, a hysteresis brake, an electric engine, a servo-motor, or an actuator.

LIST OF REFERENCE CHARACTERS

100 Drivetrain
102 Clutch device
104 Internal combustion engine
106 Two-weight flywheel
108 electric machine
110 Transmission
112 Wheel
114 Input part
116 Output part
118 Stator
120 Rotor
200 Rotor
202 Clutch
204 Actuating device
206 Rotary axis
208 Hub part
210 Moment sensor
212 Clutch disk
214 Compression plate
216 Intermediate pressure plate
218 Pressure plate
220 Hub part
222 Ramp ring
224 First ramps
226 Second ramps
228 Ball
230 Bearing
232 Hollow wheel
234 Planetary gear
236 Rod
238 Sun gear
240 Bearing
242 Shaft stub
244 Bearing
246 Actuator

The invention claimed is:

1. A clutch device with an actuating device for a drivetrain of a motor vehicle, the drivetrain comprising an internal combustion engine, an electric machine with a stator and a rotor, and a transmission device, the clutch device being arranged in the drivetrain between the internal combustion engine on the one side and the electric machine as well as the transmission device on the other side, the clutch device and the actuating device being integrated in the rotor of the electric machine, and the actuating device comprising a rotatable ramp device with first ramps and second ramps, the actuating device comprises an electric actuator for an active rotation of the ramp device, wherein the actuator acts upon the ramp device by an interposed planetary gear train.

2. A clutch device according to claim 1, wherein the actuating device comprises a rotatable ramp ring on which the first ramps are arranged, and the clutch device comprises a compression plate, axially displaceable within limits, on which the second ramps are arranged.

3. A clutch device according to claim 1, wherein the planetary gear train comprises a sun gear, planetary gears, a rod and a hollow wheel, and the sun gear is drivable by the actuator, the rod is connected fixed to the ramp device, and the hollow wheel is connected fixed to the rotor.

4. A clutch device according to claim 1, wherein the actuator comprises a magnetic clutch, a magnetic particle coupling, a magneto-rheological clutch, an electro-rheological clutch, at least one Piezo-element, a hysteresis brake, an electric engine, a servo-engine, or an actuating engine.

5. An electric machine with a stator, a rotor, and a clutch device integrated in the rotor according to claim 1.

* * * * *